(12) United States Patent
Zhamu et al.

(10) Patent No.: US 7,993,791 B2
(45) Date of Patent: Aug. 9, 2011

(54) SELF-HUMIDIFYING PROTON EXCHANGE MEMBRANE, MEMBRANE-ELECTRODE ASSEMBLY, AND FUEL CELL

(75) Inventors: Aruna Zhamu, Fargo, ND (US); Jiusheng Guo, Dayton, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 1161 days.

(21) Appl. No.: 11/257,601

(22) Filed: Oct. 26, 2005

(65) Prior Publication Data

US 2007/0092777 A1  Apr. 26, 2007

(51) Int. Cl.
*H01M 8/10* (2006.01)
*H01M 4/94* (2006.01)

(52) U.S. Cl. ........ 429/491; 429/454; 429/465; 429/479; 429/492; 252/62.2

(58) Field of Classification Search ............ 429/34, 429/454, 465, 479, 491, 492; 252/62.2
See application file for complete search history.

(56) References Cited

U.S. PATENT DOCUMENTS

| | | | |
|---|---|---|---|
| 4,435,267 A * | 3/1984 | Batzold et al. ........... 204/284 |
| 5,523,181 A | 6/1996 | Stonehart et al. |
| 5,702,838 A * | 12/1997 | Yasumoto et al. ........ 429/412 |
| 5,766,787 A * | 6/1998 | Watanabe et al. ........ 429/494 |
| 5,869,416 A * | 2/1999 | Mussell ............... 502/101 |
| 6,117,581 A * | 9/2000 | Shelef ............... 429/482 |
| 6,207,312 B1 | 3/2001 | Wynne et al. |
| 6,355,149 B1 * | 3/2002 | Soczka-Guth et al. ....... 204/296 |
| 6,403,249 B1 | 6/2002 | Reid |
| 6,562,446 B1 * | 5/2003 | Totsuka ............... 428/304.4 |
| 6,716,548 B1 * | 4/2004 | Kaliaguine et al. ......... 429/33 |
| 7,183,017 B2 * | 2/2007 | Taft et al. ............. 429/492 |
| 7,691,514 B2 * | 4/2010 | Yan et al. ............. 429/434 |
| 2004/0009384 A1 * | 1/2004 | Mathias et al. .......... 429/33 |
| 2005/0053821 A1 * | 3/2005 | Jang ............... 429/33 |
| 2005/0058875 A1 * | 3/2005 | Jerome ............... 429/34 |
| 2005/0233183 A1 * | 10/2005 | Hampden-Smith et al. .... 429/12 |
| 2006/0228607 A1 * | 10/2006 | Zaopo et al. ........... 429/33 |

OTHER PUBLICATIONS

U.S. Appl. No. 10/657,038, filed Sep. 8, 2003, B. Z. Jang.

* cited by examiner

*Primary Examiner* — Robert Hodge
*Assistant Examiner* — Amanda Barrow

(57) ABSTRACT

A self-humidifying proton exchange membrane (PEM) composition, a membrane-electrode assembly, and a fuel cell. The PEM composition comprises (a) a proton-conducting polymer; (b) a catalyst that promotes the chemical reaction between hydrogen and oxygen molecules to generate water in the membrane, and (c) a deliquescent material dispersed in this polymer. The amount of catalyst is preferably 0.01%-50% by weight on the basis of the polymer weight. The catalyst is preferably a metal catalyst selected from the group consisting of platinum, gold, palladium, rhodium, iridium, ruthenium, and mixtures and alloys thereof. Suitable deliquescent materials include, but are not limited to, calcium chloride, calcium bromide, potassium biphosphate, potassium acetate and combinations thereof. A deliquescent material absorbs and retains an essentially constant amount of moisture to keep the proton mobile in the PEM structure. The fuel cell containing such a PEM composition can be used in a higher temperature and/or lower-humidity environment.

17 Claims, 1 Drawing Sheet

SELF-HUMIDIFYING PROTON EXCHANGE MEMBRANE, MEMBRANE-ELECTRODE ASSEMBLY, AND FUEL CELL

FIELD OF THE INVENTION

This invention relates generally to a proton exchange membrane (PEM) for use in a fuel cell, and more particularly to a self-humidifying PEM, a membrane/electrode assembly (MEA) containing such a PEM, and a fuel cell comprising such an MEA.

BACKGROUND OF THE INVENTION

A fuel cell converts chemical energy into electrical energy and some thermal energy by means of a chemical reaction between a fuel (e.g., a hydrogen-containing fluid) and an oxidant (e.g., oxygen). A proton exchange membrane (PEM) fuel cell uses hydrogen or hydrogen-rich reformed gases as the fuel, a direct-methanol fuel cell (DMFC) uses methanol solution as the fuel, and a direct ethanol fuel cell (DEFC) uses ethanol solution as the fuel, etc. These types of fuel cells that require utilization of a PEM are collectively referred to as PEM-type fuel cells. As compared to other energy sources, fuel cells provide advantages that include low pollution, high efficiency, high energy density and simple fuel recharge. Fuel cells can be used in electrochemical engines, portable power supplies for various microelectronic and communication devices, standby power supply facilities, power generating systems, etc. Further, fuel cells utilize renewable resources and provide an alternative to burning fossil fuels to generate power.

A PEM-type fuel cell is typically composed of a seven-layered structure, including (a) a central PEM layer for proton transport; (b) two electro-catalyst layers on the two opposite sides of the electrolyte membrane; (c) two gas diffusion electrodes (GDLs) or backing layers stacked on the corresponding electro-catalyst layers (each GDL comprising porous carbon paper or cloth through which reactants and reaction products diffuse in and out of the cell); and (d) two flow field plates or bi-polar plates stacked on the GDLs. The flow field plates are made of carbon, metal, or conducting composite materials, which also serve as current collectors. Gas-guiding channels are defined on a GDL facing a flow field plate, or on a flow field plate surface facing a GDL. Reactants and reaction products (e.g., water) are guided to flow into or out of the cell through the flow field plates. The configuration mentioned above forms a basic fuel cell unit. Conventionally, a fuel cell stack comprises a number of basic fuel cell units that are electrically connected in series to provide a desired output voltage. If desired, cooling plates and humidifying plates may be added to assist in the operation of a fuel cell stack.

Several of the above-described seven (7) layers may be integrated into a compact assembly, e.g., a membrane-electrode assembly (MEA). An MEA typically includes a polymer electrolyte membrane bonded between two electrodes—an anode and a cathode. Typically, there exists an electro-catalyst layer between the membrane and the anode, and another electro-catalyst layer between the membrane and the cathode. Hence, an MEA is typically a five-layer structure. Most typically, the two catalyst layers are coated onto the two opposing surfaces of a membrane to form a catalyst-coated membrane (CCM). The CCM is then pressed between a carbon paper layer (the anode) and another carbon paper layer (the cathode) to form an MEA. Alternatively, a catalyst layer is deposited onto one primary surface of a carbon paper before this surface is pressed against one surface of the membrane. Commonly used electro-catalysts include noble metals (e.g., Pt), rare-earth metals (e.g., Ru), and their alloys. Known processes for fabricating high performance MEAs involve painting, spraying, screen-printing and hot-bonding catalyst layers onto the electrolyte membrane and/or the electrodes.

Hydrogen ion or proton transport through the PEM layer in a PEM-type fuel cell requires presence of water molecules within the membrane such as poly (perfluoro sulfonic acid) or PFSA (such as du Pont's Nafion®), its derivative, copolymer, or mixture. Consequently, it is critical to maintain adequate membrane hydration in order for the fuel cell to function properly. In addition to maintaining adequate ionic conductivity for proton transport, uniform membrane hydration serves to prevent localized drying, or hot spots, that could result from higher localized resistance. In general, dehydration may impede performance, increase resistive power losses, and degrade the integrity of the membrane.

In conventional fuel cells, membrane hydration is achieved by humidifying the fuel (e.g. hydrogen gas) and oxidant gases (e.g., oxygen or air) prior to their introduction into the fuel cell. One commonly used method for pre-humidifying fuel cell gas streams is to employ membrane-based humidifiers (e.g., Reid, U.S. Pat. No. 6,403,249, Jun. 11, 2002). In these situations, reactant moisture is added by allowing the respective gases to flow on one side of a water vapor exchange membrane while directing deionized water to flow on the opposite side of the membrane. Water is transported across the membrane to humidify the fuel and oxidant gases. Another known technique for pre-humidifying the reactant gas streams entails exposing the gases directly to water in an evaporation chamber to permit the gas to absorb evaporated water. Alternatively, humidification may be achieved by directly injecting or aspirating water into the respective gas streams before introducing them into the fuel cell.

Generally, pre-humidification is undesirable because it requires auxiliary fuel cell components, increasing the relative complexity of a fuel cell system. For instance, pre-humidification generally requires dedicated components for storing and transporting water. Auxiliary water storage and transport components reduce operating efficiency and add to the overall weight and cost of the system. Additional weight is an undesirable feature for a fuel cell if the cell is to be used in a portable microelectronic device such as a mobile phone or a personal data assistant (PDA). Additional components may also present system reliability issues. For example, where fuel cells are operated in sub-freezing conditions, water solidification can result in the weakening of mechanical components.

Wynne, et al. (U.S. Pat. No. 6,207,312, Mar. 27, 2001) disclosed a self-humidifying fuel cell that made use of the reaction product (water) as a source of PEM moisture, avoiding the use of auxiliary components. However, this fuel cell requires the design and construction of complex flow field channels in the gas diffusion electrodes or the flow field plates.

An interesting approach to maintaining PEM hydration is to add a filler as a moisture retainer. For instance Yuh's utilized superacids as both proton conductors and moisture retainers in a Nafion membrane (C. Y. Yuh, "R&D on an ultra thin composite membrane for high temperature operation in PEMFC," 2003 Hydrogen and Fuel Cell Merit Review, Berkely, Calif., May 19-22, 2003). Stonehart, et al. incorporated silica as a moisture retainer in an ion-exchange resin ("Polymer solid electrolyte composition and electrochemical cell using the composition," U.S. Pat. No. 5,523,181 (Jun. 4, 1996)). Watanabe, et al. added a metal catalyst in a polymer electrolyte to catalyze the chemical reaction between hydrogen and oxygen molecules that diffuse into the electrolyte membrane to produce water therein ("Solid polymer electrolyte composition," U.S. Pat. No. 5,766,787 (Jun. 16, 1998)). Watanabe, et al. further proposed to add a metal oxide to help retain the water produced. However, most of the metal oxides were not very effective water retainers or water captors. Hence, metal oxides in a PEM did not further improve the performance of a fuel cell operated at a temperature higher than 80° C. or at a humidity level lower than 50% RH. In one of our earlier inventions (B. Z. Jang, "Self-Moisturizing Proton Exchange Membrane, Membrane Electrode Assembly and Fuel Cell," U.S. Patent Pending (Ser. No. 10/657,038) Sep. 8, 2003), a deliquescent material was added to a PEM to significantly improve the membrane's ability to capture and retain moisture. None of the aforementioned approaches made use of a judicious combination of a metal catalyst and a deliquescent material dispersed in a polymer matrix to form a self-humidifying membrane for fuel cell applications.

Currently, PFSA polymers and their close derivatives dominate the membrane market for PEM fuel cells. These polymers can only be used in fuel cells that operate at relatively low temperatures (<80° C.). Fuel cells that operate at higher temperatures (>120° C. or even >150° C.) offer several advantages: increased catalytic activity (fast electrode kinetics), higher tolerance to fuel impurities (simplified reformer-purification system resulting in reduced cost, weight, volume, and response time), simplified water management (simplified stack construction and operation), and increased value of heat recovery. The need or desire to operate fuel cells at higher temperatures presents difficult new challenges for the PEM polymers. This difficulty stems primarily from the decrease in water content of the polymer electrolytes in the desired temperature range. Specifically, when a fuel cell is operated at a higher temperature, the PEM therein tends to get severely dehydrated, thereby significantly degrading the proton conductivity. Although thermally stable polymers such as poly (ether ether ketone) or PEEK have been sulfonated to produce proton-conducting membranes, their reliability and stability in a fuel cell operating in high temperature and low humidity conditions have remained questionable. Clearly, there is an urgent need for a PEM that can operate at a temperature higher than 120° C. in a low humidity environment (25-50% RH).

SUMMARY OF THE INVENTION

It is an object of this invention to provide a self-humidifying composite PEM, a membrane-electrode assembly (MEA), and a fuel cell, which are capable of maintaining membrane hydration during the storage and operation of the fuel cell, and particularly for operations under higher temperature (>80° C., preferably >120° C.) and/or lower ambient humidity conditions (<50% RH).

It is another object of this invention to provide a PEM fuel cell in which membrane hydration is maintained using water that is primarily generated internally in the PEM material or water as a byproduct of electrochemical reactions within the fuel cell.

It is a further object of this invention to provide a PEM fuel cell which does not require components dedicated to pre-humidification of reactant gas streams.

These and other objects of the invention are achieved by the PEM composition, the MEA and the fuel cell of the present invention. A self-humidifying PEM-type fuel cell has a membrane electrode assembly (MEA), comprising an ion-exchange membrane interposed between catalyzed anode and cathode electrodes. The MEA is interposed between a pair of gas diffusion backings, and the resulting structure is interposed between fuel and oxidant flow field plates. The fuel flow field plate has a fuel stream inlet, a fuel stream outlet, and means for flowing the fuel stream therebetween. The oxidant flow field plate has an oxidant stream inlet, an oxidant stream outlet, and means for flowing the oxidant stream therebetween.

In a preferred embodiment, the PEM composition comprises (a) a proton-conducting polymer; (b) a catalyst that promotes the chemical reaction between hydrogen and oxygen molecules to generate water in the membrane, and (c) a deliquescent material dispersed in this polymer. The amount of catalyst is preferably 0.01%-50% by weight on the basis of the polymer weight. The catalyst is preferably a metal catalyst selected from the group consisting of platinum, gold, palladium, rhodium, iridium, ruthenium, and mixtures and alloys thereof. Suitable deliquescent materials include, but are not limited to, calcium chloride, calcium bromide, potassium biphosphate, potassium acetate and combinations thereof. A deliquescent material absorbs an essentially constant amount of moisture to keep the proton mobile in the PEM structure. The presence of a deliquescent material acts to maintain a dynamic equilibrium of water vapor between the deliquescent material and the PEM layer.

DETAILED DESCRIPTION OF THE PREFERRED EMBODIMENTS

Figure 1:
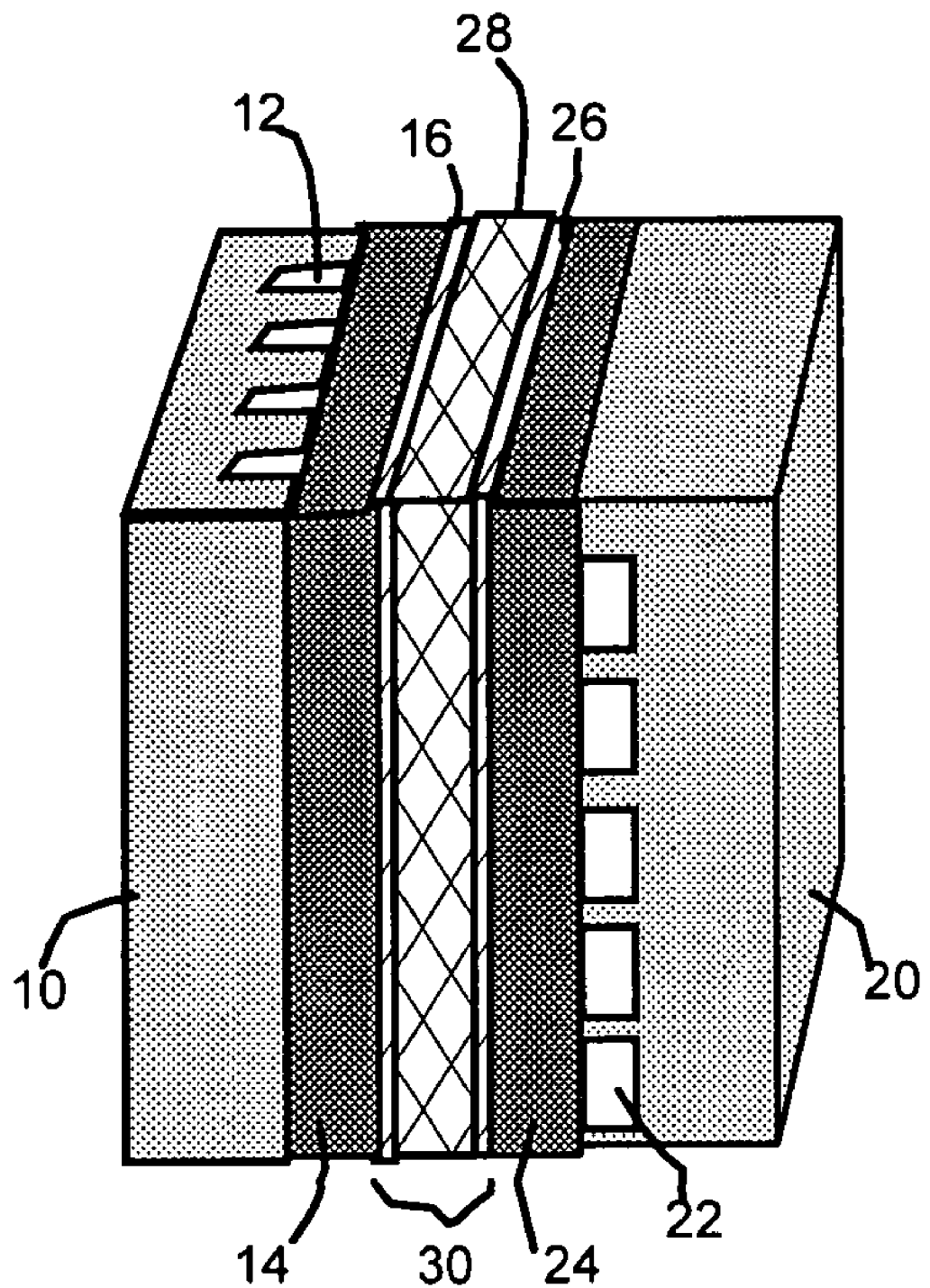
FIG. 1 Schematic of a PEM fuel cell assembly in accordance with the present invention.

The present invention provides a self-humidifying proton exchange membrane (PEM) composition, a membrane-electrode assembly, and a fuel cell. The PEM composition comprises a) a proton-conducting organic or polymer material as a matrix or binder; (b) a catalyst (0.01 to 50% by weight based on the polymer weight) dispersed in the matrix or bonded by the binder to promote a chemical reaction (recombination) between hydrogen and oxygen molecules that permeate into the membrane; and (c) a non-oxide deliquescent material (0.01-50% by weight also based on the polymer weight) dispersed in the matrix or bonded by the binder for capturing and retaining water in the membrane to facilitate proton transport therein.

The matrix or binder material functions as a proton conductor, as well as a host or support for the water generation-promoting catalyst and the water-capturing and water-retaining deliquescent material. Selected deliquescent materials may also form ionically conductive phases in a polymer matrix. Suitable matrix materials possess sufficient chemical and dimensional stability to allow fabrication and to function in their intended environments. Of particular interest are suitable matrix materials that maintain physical and dimensional stability at high temperatures, preferably above 80° C., more preferably above about 120° C., and even more preferably above about 150° C. Most preferably, the matrix exhibits a sufficiently high proton conductivity to enable fuel cell operations and maintains integrity at temperatures in the range from about 80° C. to about 200° C. The matrix material, or at least a portion of the matrix material, further preferably maintains its integrity in oxidizing, reducing, acidic, and alkaline environments. Preferred matrix materials also have negligible electronic conductivity.

Materials suitable for use as matrices or binders in the present membranes include, but are not limited to, sulfonated versions of the following polymers: polytetrafluoroethylene (PTFE), polyvinylidene fluoride (PVDF), polyetheretherketone (PEEK), polyethersulfone (PES), perfluoroalkoxy (PFA), fluorinated ethylene propylene (FEP), polybenzimidazole, polyimide (PI), polyamide-imide (PAI), poly(phenylene oxide), and copolymers and mixtures thereof. The polymer matrix preferably has a glass transition point (Tg) in the range from about 100° C. to about 350° C., preferably in the range of 150° C. to about 350° C.

In one preferred embodiment, the PEM is an ion exchange membranes having sulfonic acid groups. These materials hydrate when exposed to water, with hydrogen ion $H^+$ detached from sulfonic ion, $SO_3^-$. The general structure of the sulfonic acid membranes that have received extensive attention for use in fuel cells and are sold under the trade name Nafion® by E. I. du Pont Company is as follows:

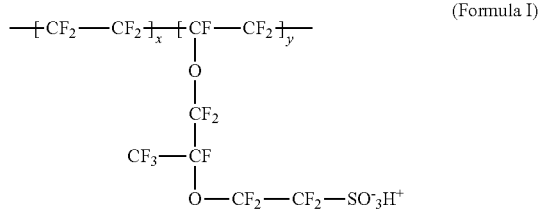

(Formula I)

where x and y are integers selected from 1 to 100,000, preferably from 1 to 20,000, most preferably from 100 to 10,000. A similar polymer that is also a suitable PEM is given as:

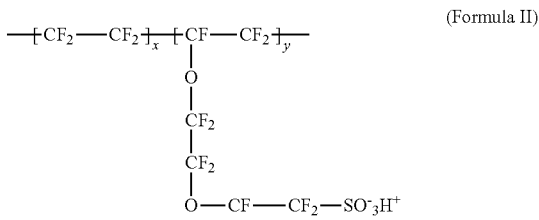

(Formula II)

Sulfonic acid polymers having a shorter chain between the pendant functional group (side group) and the main polymer backbone absorb less water at a given concentration of functional group in the polymer than do polymers having the general structure as shown by Formula I and II. The concentration of functional group in the dry polymer is expressed as an equivalent weight. Equivalent weight is defined, and conveniently determined by standard acid-base titration, as the formula weight of the polymer having the functional group in the acid form required to neutralize one equivalent of base. In a more general form, this group of proton-conducting polymers may be represented by the formula:

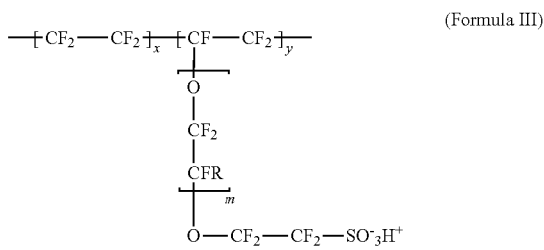

(Formula III)

where x and y are integers selected from 1 to 100,000, m is an integer selected from 0 to 10 and R is a functional group selected from the group consisting of H, F, Cl, Br, I, and $CH_3$.

Another class of PEM polymers suitable for use in the fuel cell is characterized by a structure having a substantially fluorinated backbone which has recurring pendant groups attached thereto and represented by the general formula:

(Formula IV)

where a=0-3, b=0-3, a+b=at least 1, $R_f$ and $R_f^{'}$ are independently selected from the group consisting of a halogen and a substantially fluorinated alkyl group having one or more carbon atoms.

Still another group of sulphonic acid polymers suitable for the present fuel cell PEM applications comprises a repeating unit represented by the following formula:

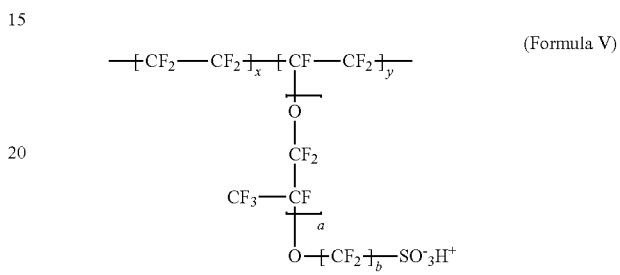

(Formula V)

where a is 0, 1, or 2, b is 2 or 3, x and y are positive integer numbers and x/y ratio is of 10 or less. This polymer was found by Noaki, et al. (U.S. Pat. No. 5,449,697, Sep. 12, 1995) to be a good fuel cell PEM material. We have found that the addition of a deliquescent material and a metal catalyst helps to maintain an essentially constant moisture level in the sulfonic acid polymer-based PEM layer of a fuel cell.

The above PFSA-type polymers, from formula I to formula V, typically cannot be used in a fuel cells intended for operations in a higher temperature (>80° C.) or lower humidity (<60 RH) environment. Of particular interest are those PEM materials derived from thermally stable polymers, which are typically aromatic or heterocyclic organics having a glass transition temperature between 150 and 350° C. One example of these high-temperature polymers is polyether ether ketone (PEEK) which, upon sulfonation, becomes S-PEEK, as shown below:

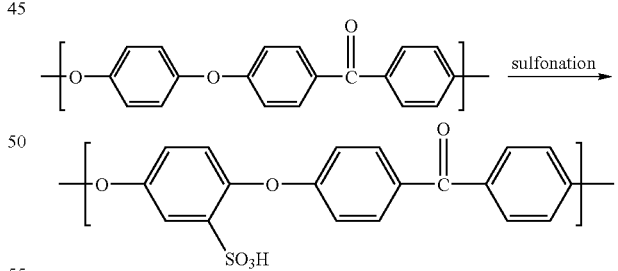

The above polymers also have a detachable hydrogen ion (proton) that is weakly attached to a counter-ion (e.g., $SO_3^-$), which is covalently bonded to a pendant group or backbone benzine ring of the polymer. While the general structures shown above are representative of several groups of polymers of the present invention, they are not intended to limit the scope of the present invention. It would become obvious to those skilled in the art, from the relationships presented herein that other sulfonic acid functional polymers having pendant chains, sterically hindered sulfonate groups or the like would absorb some water and conduct protons. For instance, the derivatives and copolymers of the aforementioned sulfonic acid polymers, alone or in combination with other polymers to form polymer blends, may also be used as PEM in the invented fuel cell. Examples of useful higher temperature matrix polymers are sulfonated poly ether ether ketone, sulfonated poly ethersulfone, sulfonated perfluoroalkoxy, polybenzimidazole, sulfonated polyimide, sulfonated polyamide-imide, sulfonated poly phenylene oxide, and copolymers and mixtures thereof. In addition, matrix polymers such as sulfonated poly vinylidene fluoride and sulfonated fluorinated ethylene propylene may also be used in the presently invented composite membrane.

The water production-promoting catalyst is preferably a metal catalyst selected from the group consisting of platinum, gold, palladium, rhodium, iridium, ruthenium, and mixtures and alloys thereof. The content of the metal catalyst contained in the polymer matrix in a well dispersed state is 0.01 to 50% by weight, and preferably 0.1 to 15% by weight based on the weight of the polymer matrix. The average particle size of the metal catalyst is preferably not more than 0.1 μm, and preferably not more than 0.01 μm. A reduction in particle size effectively increases the particle surface-to-volume ratio and promotes catalytic activities.

A deliquescent material refers to a hygroscopic agent, a desiccant composition, a water absorbent, or a moisture exchange element or compound. These materials are able to effectively absorb or capture the moisture from the atmospheric air and keep a material or structure moistened. In an enclosed or partially closed container, these materials can help maintain a dynamic moisture equilibrium between these materials and a target material inside the container.

Atmospheric water vapor can be utilized for useful purposes through the use of many compounds which are extremely hygroscopic in nature. A hygroscopic material can absorb water out of the atmosphere causing the material or its mixture become deliquescent. Indeed, there are some solid compounds which are so hygroscopic that they will literally create their own self solutions, and continue to dilute themselves even when a solution is formed because the solutions of these compounds are in turn hygroscopic.

The membrane composition of this invention comprises a combination of a strongly hydroscopic agent, and a proton conducting polymer. The hygroscopic agents are preferably those which will form a pasty mix by absorbing atmospheric water vapor. A variety of metal halides such as aluminum chloride, magnesium chloride, calcium chloride, zinc chloride, or iron chloride are very useful as the hygroscopic material. In addition, metal nitrates, such as zinc nitrate, magnesium nitrate, and iron nitrate, can also be used as the hygroscopic agent.

Several organic ions which form deliquescent salts are also sufficiently hygroscopic to serve in this invention. These include sodium formate, sodium ethyl sulfate and magnesium acetate. In addition, purely organic materials, such as polyethylene glycol or polyvinyl pyrrollidone are useful in absorbing water from the atmosphere.

In one preferred embodiment, the deliquescent material is uniformly dispersed in the PEM polymer. This may be achieved by dissolving or dispersing both the PEM polymer and the deliquescent material in a common solvent or dispersing medium to form a solution or suspension. The solution or suspension is then made into a layer of modified PEM by spin-casting, printing, spraying, or any other polymer processing technique that involves eventually removing the common solvent or medium. Typically, the volume fraction of the deliquescent material in the PEM composition (deliquescent material+PEM polymer) may vary from 0.5% to 50%, but preferably from 5% to 25%. When the volume fraction of the deliquescent material exceeds 30-40%, the over-all proton conductivity in the PEM composition begins to decrease significantly.

The deliquescent material by being hygroscopic maintains the membrane moisturized at all times. The level of moisture within the PEM may vary depending on the deliquescent material selected, its concentration and air humidity. We have found that suitable deliquescent materials for the present invention include, but are not limited to, zinc chloride, calcium chloride, magnesium chloride, lithium chloride, calcium bromide, potassium biphosphate, potassium acetate, phosphorous oxide, ammonium acetate, sodium acetate, sodium silicate, potassium silicate, magnesium sulfate, aluminum oxide, calcium oxide, silicon oxide, zeolite, barium oxide, cobalt chloride, bentonite, montmorillonite clay, silica gel, molecular sieve, monohydric compounds, polyhydric compounds, metal nitrate salt, sodium ethyl sulfate organic salt, polyethylene glycol, and combinations thereof. We have found that metal oxides are generally much less effective than others cited above such as chloride, acetate, sulfate, or phosphate.

The procedures for preparing a composite material containing a metal particle phase and/or a ceramic phase (e.g., oxide, chloride, and acetate particles) are well known in the art. For instance, the preparation of a Nafion-zinc chloride composite may proceed with the following procedure: A solution containing 240 mg of poly (perfluoro sulfonic acid) (PFSA) and 120 mg of zinc chloride (a deliquescent material) in 3.0 ml of ethanol is first prepared. This solution is then cast onto a piece of glass with the solvent evaporated in a chemical fume hood to form a layer of PFSA-$ZnCl_2$ mixture. The addition of platinum in a PFSA matrix may be accomplished by the procedure proposed by Watanabe, et al. (U.S. Pat. No. 5,766,787, Jun. 16, 1998).

The following procedure was followed to prepare membrane electrode assemblies (MEAs) in our laboratory. An electro-catalyst material (e.g., a powder of Pt dispersed on carbon) was first prepared in a liquid ink form by thoroughly mixing together appropriate amounts of the electro-catalyst and a solution of the membrane composition (94.5% Nafion® from du Pont and 5.5% potassium biphosphate) in alcohol. A layer of catalyst ink was then painted onto a dry, solid piece of the same membrane composition (94.55% Nafion® and 5.5% potassium biphosphate). The wet catalyst layer and the membrane were heated until the catalyst layer was dry. The membrane was then turned over and the procedure was repeated on the other side. Electro-catalyst layers are now on both sides of the membrane. The dry MEA was next re-hydrated by immersing in lightly boiling dilute acid solution to ensure that the membrane is in the H+ form needed for proton conduction. The MEA was then thoroughly rinsed in distilled water.

For each of the samples studied, MEA was inserted into the hardware of the fuel cell, including backing layers, flow fields, and current collectors. A porous carbon paper of approximately 100 μm thick, treated with Teflon®, was used as a cathode backing layer. The abode backing layer was untreated carbon paper. One backing layer was attached to one side of an MEA and another backing layer attached to the other side. One electronically conducting plate was then pressed against the outer surface of each backing layer. The two plates serve the dual role of flow field and current collector for both cathode and anode. The surface of a plate next to the backing layer contains channels machined into the plate. The channels are used to carry the reactant gas from the point at which it enters the fuel cell to the point at which the gas exits. The fuel cells were evaluated by allowing them to operate in an environmental chamber where temperature and humidity were controlled. In two cases, the operation conditions are: 80° C. and 50% RH for Nafion-based membranes and 120° C. and 35% RH for S-PEEK based membranes.

TABLE 1

Examples of PEM compositions investigated.

| Sample ID | Polymer matrix | Deliquescent Material | Catalyst | Other additive |
|---|---|---|---|---|
| 1 | Nafion | 0 | 0 | 0 |
| 1-CD-1 | Nafion | 5% titanium oxide | 6% platinum | 0 |
| 1-C-1 | Nafion | 0 | 6% platinum | 0 |
| 1-D-1 | Nafion | 5% titanium oxide | 0 | 0 |
| 1-CD-2 | Nafion | 5% potassium acetate | 6% platinum | 0 |
| 1-D-2 | Nafion | 5% potassium acetate | 0 | 0 |
| 2 | S-PEEK | 0 | 0 | 0 |
| 2-CD-1 | S-PEEK | 6% silicate | 4.5% platinum | 0 |
| 2-A-1 | S-PEEK | 0 | 0 | 20% boron phosphate* |
| 2-CD-2 | S-PEEK | 5.5% potassium biphosphate | 4.5% platinum | 0 |
| 2-CDA-1 | S-PEEK | 5.5% potassium biphosphate | 4.5% platinum | 10% boron phosphate |

*Note:
boron phosphate is an inorganic proton conductor.

Listed in Table 1 are selected Nafion- and S-PEEK-based PEM composite compositions studied. The samples were prepared to include a pure polymer membrane (either Nafion or S-PEEK), a composite containing only a metal catalyst for promoting internal water generation, a composite containing only a deliquescent material (either oxide or non-oxide), a composite containing both a metal catalyst and a deliquescent material, a composite containing only an inorganic proton conducting solid phase (e.g., boron phosphate), and a composite containing a metal catalyst, a deliquescent material, and an inorganic proton conducting solid. The membrane thickness was adjusted to be approximately 60 μm.

The resistance values and current densities (at a cell voltage of 0.65V) of all the fuel cells featuring the membranes listed in Table were measured and the results are shown in Table 2.

TABLE 2

Performance of fuel cells featuring the PEM compositions listed in Table 1.

| Sample ID | Resistance, Ucm2 | Current density, mA/cm2 |
|---|---|---|
| 1 | 31 | 20 |
| 1-CD-1 | 0.16 | 450 |
| 1-C-1 | 0.2 | 115 |
| 1-D-1 | 0.25 | 165 |
| 1-CD-2 | 0.14 | 520 |
| 1-D-2 | 0.19 | 205 |
| 2 | 61 | 20 |
| 2-CD-1 | 0.26 | 170 |
| 2-A-1 | 0.2 | 230 |
| 2-CD-2 | 0.18 | 260 |
| 2-CDA-1 | 0.11 | 560 |

Cell operation conditions: 80° C. and 50% RH for Nafion-based; 120° C. and 35% RH for S-PEEK based membranes.

A comparison between the data for sample 1 (pure Nafion) and the data for both samples 1-CD-1 (Nafion+metal catalyst+oxide) and 1-CD-2 (Nafion+metal catalyst+non-oxide deliquescent material) indicate the superior performance of the developed self-humidifying composite membranes. Clearly, the non-oxide deliquescent material (e.g., potassium acetate) is more effective than the oxide (e.g., titania) in capturing and retaining water in a membrane. Similar trends were observed for S-PEEK-based membranes when comparisons are made between sample 2 and sample 2-CD-1, between sample 2 and sample 2-CD-2, and between sample 2-CD-1 and sample 2-CD-2. Among this group of three membranes, the membrane (2-CD-2) with a metal catalyst and a non-oxide deliquescent material exhibited the lowest resistance and highest current density at a given voltage.

The data of Table 2 also indicate that either metal catalyst alone (1-C-1) or deliquescent material alone (1-D-2) is not as effective as the membrane containing both materials (1-CD-2). There appears to be a synergistic effect between the two species—one promoting water generation and the other water retaining. Without a water retainer, the water generated from internal recombination of hydrogen and oxygen might be partially lost when the fuel cell operates in a high temperature and/or low-humidity environment. Without a metal catalyst, a deliquescent material can only capture moisture from the water molecules residing in the fuel and oxidant flow, or from those produced at the cathode as an electro-chemical reaction byproduct. Co-existence of the two functional fillers produce a highly desirable result—keeping the membrane adequately humidified even under a severely drying operation condition.

The results summarized in Table 2 also demonstrate that both oxide and non-oxide deliquescent materials can be used to enhance the proton conductivity of a high temperature polymer matrix such as sulfonated polyether ether ketone (S-PEEK), with a glass transition temperature (Tg) higher than 100° C.; typically 150° C.<Tg<350° C. These polymers are derived from thermally stable, aromatic or heterocyclic molecular structures. They include sulfonated poly ether ether ketone, sulfonated poly ethersulfone, sulfonated perfluoroalkoxy, polybenzimidazole, sulfonated polyimide, sulphonated polyamide-imide, sulfonated poly phenylene oxide, and copolymers and mixtures thereof. These polymers were largely ignored by Watanabe, et al. (U.S. Pat. No. 5,766, 787, Jun. 16, 1998), who have essentially limited their studies to PFSA-type polymer matrices.

Additional conclusions, which are very interesting and useful, can be drawn from the data for S-PEEK-based samples. An inorganic proton conductor solid such as zirconium sulphate or boron phosphate could be used to enhance the proton conductivity of a high temperature polymer membrane such as S-PEEK. This was proposed by, for instance, Kaliaguine, et al. (U.S. Pat. No. 6,716,548, Apr. 6, 2004). We speculated that the operation of these inorganic proton conductors also relied on the presence of water. This speculation was verified by comparing the data of sample 2-A-1 and the data of sample 2-CDA-1. The two samples contain comparable total filler concentrations, approximately 20% by weight each. Sample 2-A-1 contains 20% of a proton conductor solid (boron phosphate), but sample 2-CDA-1 contains 10% of boron phosphate, augmented by 5.5% of a deliquescent material and 4.5% of a metal catalyst. The latter two ingredients provide a good moisture level to both the S-PEEK matrix and the proton-conducting boron phosphate phase, resulting in significantly improved current densities and reduced membrane resistance. This is a highly significant observation since an ever increasing number of composite membranes is being investigated and developed. In most cases, the presence of an adequate amount of water is essential to successful operation of these membranes. The inorganic proton conductor solid may be selected from the group consisting of zirconium oxophosphate, titanium oxophosphate, zirconium sulphate, titanium sulphate, boron phosphate, acid grafted silica materials and mixtures thereof.

The scope of the present invention is not limited to just PEM compositions and MEAs comprising these PEMs. Rather, it also includes fuel cells that comprise the developed PEM compositions. Thus, another preferred embodiment of the present invention is a fuel cell (FIG. 1) comprising a central polymer electrolyte membrane 28 with two primary surfaces, two separate electrode/catalyst layers 16,26 each with an inner surface attached to or integral with one of the two primary surfaces, two backing layers 14,24 attached to the outer surfaces of the electrode/catalyst layers, and two respective flow field/current collector plates 10,20 pressed against the outer surfaces of the backing layers 14,24. Inside the anode current collector/flow field plate 10 are built-in channels 12 for hydrogen fuel transport. Similarly, the cathode current collector/flow field plate 20 has flow channels 22 to admit air or oxygen and to exit water and un-used air. The polymer electrolyte membrane 28, the anode catalyst layer 16 and the cathode catalyst layer 26 together constitute a membrane/electrode assembly (MEA). In this fuel cell, at least one of the PEM layers comprises a desired amount of a deliquescent material and a metal catalyst, which serves to self-moisturize the membrane layer.

While the invention has been described with respect to a limited number of embodiments, it will be appreciated that many variations, modifications and other applications of the invention may be made.

What is claimed is:

1. A self-humidifying proton exchange membrane composition for use in a fuel cell, said composition comprising:
   (a) a proton-conducting organic or polymer material as a matrix or binder;
   (b) a catalyst, 0.01 to 50% by weight, dispersed in said matrix or bonded by said binder, wherein said catalyst catalyzes a chemical reaction between hydrogen and oxygen molecules that permeate into said membrane; and
   (c) a non-oxide deliquescent material, 0.01-50% by weight, dispersed in said matrix or bonded by said binder independently of said catalyst, wherein said deliquescent material captures and retains water in said membrane to facilitate proton transport therein; and
   wherein said deliquescent material is selected from the group consisting of zinc chloride, calcium chloride, magnesium chloride, lithium chloride, calcium bromide, potassium biphosphate, sodium formate, potassium acetate, ammonium acetate, sodium acetate, sodium silicate, magnesium acetate, potassium silicate, magnesium sulfate, cobalt chloride, bentonite, montmorillonite clay, silica gel, molecular sieve, monohydric compounds, polyhydric compounds, metal nitrate salt, sodium ethyl-sulfate organic salt, polyethylene glycol, polyvinyl pyrrollidone, and combinations thereof.

2. The membrane composition as defined in claim 1, wherein said proton-conducting polymer is selected from the group consisting of poly (perfluoro sulfonic acid), its chemical derivative, its copolymer, its blend with a second polymer, and combinations thereof.

3. The membrane composition as defined in claim 1, wherein said proton-conducting polymer is selected from the group consisting of sulfonated poly vinylidene fluoride, sulfonated poly ether ether ketone, sulfonated poly ethersulfone, sulfonated perfluoroalkoxy, sulfonated fluorinated ethylene propylene, polybenzimidazole, sulfonated polyimide, sulphonated polyamide-imide, sulfonated poly phenylene oxide, and copolymers and mixtures thereof.

4. The membrane composition as defined in claim 1, wherein said catalyst is selected from the group consisting of platinum, gold, palladium, rhodium, iridium, ruthenium, and mixtures and alloys thereof.

5. The membrane composition as defined in claim 1, further comprising 0.01 to 50% by weight of a proton-conducting solid dispersed in said matrix or bonded by said binder.

6. The membrane composition as defined in claim 5, wherein said proton-conducting solid is an inorganic solid selected from the group consisting of zirconium oxophosphate, titanium oxophosphate, zirconium sulphate, titanium sulphate, boron phosphate, acid grafted silica materials and mixtures thereof.

7. A membrane electrode assembly (MEA) comprising an anode, a cathode, and a membrane composition as defined in claim 1, said membrane being interposed between said anode and said cathode and said anode and said cathode comprising electro-catalysts thereon or therein.

8. A self-humidifying fuel cell comprising:
   (a) a central membrane composition as defined in claim 1 for proton transport, said membrane comprising two opposite primary surfaces;
   (b) two electro-catalyst layers on the two opposite surfaces of the membrane to promote electro-chemical reactions;
   (c) two gas diffusion electrodes stacked on said electro-catalyst layers, each gas diffusion electrode comprising an electronically conducting, porous material through which reactants and reaction products diffuse in and out of the cell; and
   (d) two flow field plates stacked on said gas diffusion electrodes.

9. A self-humidifying fuel cell comprising:
   (a) a central membrane composition as defined in claim 5 for proton transport, said membrane comprising two opposite primary surfaces;
   (b) two electro-catalyst layers on the two opposite surfaces of the membrane to promote electro-chemical reactions;
   (c) two gas diffusion electrodes stacked on said electro-catalyst layers, each gas diffusion electrode comprising an electronically conducting, porous material through which reactants and reaction products diffuse in and out of the cell; and
   (d) two flow field plates stacked on said gas diffusion electrodes.

10. A self-humidifying proton exchange membrane composition for use in a fuel cell, said composition comprising:
    (a) a proton-conducting polymer material as a matrix or binder, said polymer having a glass transition temperature higher than 100° C.;
    (b) a catalyst, 0.01 to 50% by weight, dispersed in said matrix or bonded by said binder, wherein said catalyst catalyzes a chemical reaction between hydrogen and oxygen molecules that permeate into said membrane; and
    (c) a non-oxide deliquescent material, 0.01-50% by weight, dispersed in said matrix or bonded by said binder independently of said catalyst, wherein said deliquescent material captures and retains water in said membrane to facilitate proton transport therein; and
    wherein said deliquescent material is selected from the group consisting of zinc chloride, calcium chloride, magnesium chloride, lithium chloride, calcium bromide, potassium biphosphate, sodium formate, potassium acetate, ammonium acetate, sodium acetate, sodium silicate, magnesium acetate, potassium silicate, magnesium sulfate, cobalt chloride, bentonite, montmorillonite clay, silica gel, molecular sieve, monohydric compounds, polyhydric compounds, metal nitrate salt, sodium ethyl-sulfate organic salt, polyethylene glycol, polyvinyl pyrrollidone, and combinations thereof.

11. The membrane composition as defined in claim 10, further comprising 0.01 to 50% by weight of a proton-conducting solid dispersed in said matrix or bonded by said binder.

12. The membrane composition as defined in claim 11, wherein said proton-conducting solid is an inorganic solid selected from the group consisting of zirconium oxophosphate, titanium oxophosphate, zirconium sulphate, titanium sulphate, boron phosphate, acid grafted silica materials and mixtures thereof.

13. A membrane electrode assembly (MEA) comprising an anode, a cathode, and a membrane composition as defined in claim 10 and being interposed between said anode and said cathode, said anode and said cathode comprising electro-catalysts thereon or therein.

14. A membrane electrode assembly (MEA) comprising an anode, a cathode, and a membrane composition as defined in claim 11 and being interposed between said anode and said cathode, said anode and said cathode comprising electro-catalysts thereon or therein.

15. A self-humidifying fuel cell comprising:
(a) a central membrane composition as defined in claim 10 for proton transport, said membrane comprising two opposite primary surfaces;
(b) two electro-catalyst layers on the two opposite surfaces of the membrane to promote electro-chemical reactions;
(c) two gas diffusion electrodes stacked on said electro-catalyst layers, each gas diffusion electrode comprising an electronically conducting, porous material through which reactants and reaction products diffuse in and out of the cell; and
(d) two flow field plates stacked on said gas diffusion electrodes.

16. A self-humidifying fuel cell comprising:
(a) a central membrane composition as defined in claim 11 for proton transport, said membrane comprising two opposite primary surfaces;
(b) two electro-catalyst layers on the two opposite surfaces of the membrane to promote electro-chemical reactions;
(c) two gas diffusion electrodes stacked on said electro-catalyst layers, each gas diffusion electrode comprising an electronically conducting, porous material through which reactants and reaction products diffuse in and out of the cell; and
(d) two flow field plates stacked on said gas diffusion electrodes.

17. The membrane composition as defined in claim 10, wherein said proton-conducting polymer is selected from the group consisting of sulfonated poly ether ether ketone, sulfonated poly ether sulfone, sulfonated perfluoroalkoxy, polybenzimidazole, sulfonated polyimide, sulphonated polyamide-imide, sulfonated poly phenylene oxide, and copolymers and mixtures thereof.

* * * * *